United States Patent [19]

Hurst

[11] Patent Number: 4,639,773

[45] Date of Patent: Jan. 27, 1987

[54] APPARATUS FOR DETECTING MOTION IN A VIDEO IMAGE BY COMPARISON OF A VIDEO LINE VALUE WITH AN INTERPOLATED VALUE

[75] Inventor: Robert N. Hurst, Cherry Hill, N.J.

[73] Assignee: RCA Corporation, Princeton, N.J.

[21] Appl. No.: 799,858

[22] Filed: Nov. 20, 1985

Related U.S. Application Data

[60] Division of Ser. No. 601,365, Apr. 17, 1984, abandoned, which is a continuation of Ser. No. 226,712, Jan. 21, 1981, abandoned.

[51] Int. Cl.$^4$ .............................................. H04N 7/18
[52] U.S. Cl. .................................... 358/105; 360/33.1
[58] Field of Search .......................... 360/38.1, 33.1; 358/21 R, 105, 314, 336

[56] References Cited

U.S. PATENT DOCUMENTS

| | | | |
|---|---|---|---|
| 4,027,333 | 5/1977 | Kaiser et al. | 358/146 |
| 4,107,736 | 8/1978 | Lowry et al. | 358/105 X |
| 4,163,249 | 7/1979 | Michael et al. | 358/21 R |
| 4,168,510 | 9/1979 | Kaiser | 358/105 X |
| 4,199,780 | 4/1980 | Taylor | 358/314 X |
| 4,214,263 | 7/1980 | Kaiser | 358/105 X |
| 4,216,504 | 8/1980 | Boussina et al. | 358/907 X |
| 4,240,106 | 12/1980 | Michael et al. | 358/36 |
| 4,240,109 | 12/1980 | Michael et al. | 358/105 |
| 4,272,787 | 6/1981 | Michael et al. | 358/160 |
| 4,275,418 | 6/1981 | Trump et al. | 358/167 |
| 4,288,815 | 9/1981 | Miles | 358/105 |
| 4,296,436 | 10/1981 | Achiha | 358/167 |
| 4,315,331 | 2/1982 | Lemoine et al. | 360/38.1 X |
| 4,322,750 | 3/1982 | Lord et al. | 358/140 |
| 4,339,803 | 6/1982 | Michael et al. | 364/724 |
| 4,361,853 | 11/1982 | Remy et al. | 358/167 |
| 4,376,290 | 3/1983 | Shirota | 360/38.1 X |
| 4,380,069 | 4/1983 | Reitmeier et al. | 360/38.1 X |

Primary Examiner—Raymond F. Cardillo
Assistant Examiner—Wayne R. Young
Attorney, Agent, or Firm—E. M. Whitacre; P. J. Rasmussen; E. P. Herrmann

[57] ABSTRACT

A motion detector for detecting the occurrence of image changes between successive fields of video information includes a signal averager for averaging the video signal from two lines of video signal of one video field and a signal averager for averaging the video signal from three lines of video signal of a successive field. The two average video signals are coupled to comparing means which develops a motion indicating signal when the two average video signals differ.

7 Claims, 7 Drawing Figures

APPARATUS FOR DETECTING MOTION IN A VIDEO IMAGE BY COMPARISON OF A VIDEO LINE VALUE WITH AN INTERPOLATED VALUE

This is a division of U.S. patent application Ser. No. 601,365, filed Apr. 17, 1984. U.S. patent application Ser. No. 601,365 is a continuation of U.S. patent application Ser. No. 226,712, filed Jan. 21, 1981, both of which have been abandoned.

BACKGROUND OF THE INVENTION

This invention relates to motion detection apparatus in a video signal processing system.

The invention is applicable to varied video processing systems including means for delaying video signals by field intervals or greater. However, the invention will be described in the environment of a video tape recorder, VTR.

In magnetic recording, the quality of the recorded medium generally determines the duration and occurrence rate of dropouts or signal defects which cause information gaps or voids during replay. Defects on the recorded medium along tracks travelled by transducer heads when recording or replaying information are the cause of such dropouts. One example of such a defect is the stipples or bumps of magnetic oxide which occur periodically on a magnetic recorded medium. The stipples cause the transducer heads to bounce off the recorded medium and thereby result in the information gaps while the transducer heads are removed from the recorded medium.

Gaps in the record and replay information due to dropout always present a problem, especially when the recorded information is video. Many techniques have been devised for coping with the problem of video dropout during replay by replacing the missing dropout information with information derived through an analysis of the recorded information in close proximity to the missing dropout information. In one simple technique, the location of missing or dropout information in any field or frame is sensed and replaced with information from the same field or frame having a high probability of being similar to the missing information. The replacement information is continuously derived by circulating the replayed signal through a delay of duration equal to either one or two raster scan lines. As is well known, use of a one line delay requires that a processor be included to change the subcarrier phase of the replacement information, whereas use of a two line delay requires no such processor. When recorded scenes contain only vertical lines, this technique provides exact replacements for missing dropout information. However, such replacements become imperfect when recorded scenes contain diagonal lines. Furthermore, this technique derives replacement information for dropouts of durations greater than one scan line by repeatedly using the information in the delay. This causes an instantaneous disturbance in the replayed signal which appears in a portion of the displayed picture as a vertical smear and is highly visible.

To resolve the difficulties encountered with the technique described above, a field store delay is combined with the raster scan line delay for directly replacing missing dropout information with information from either the raster scan line delay or the field store delay in accordance with the nature of the dropout information. Dropout information is replaced with information from the field store delay when no motion is detected in the picture. Alternatively, dropout information is replaced with information from the line store delay when motion is detected in the picture.

To switch from field to line delayed dropout compensation signals when image motion occurs, it is necessary to detect the occurrence of image motion in the vicinity of dropouts.

SUMMARY OF THE INVENTION

The present invention is a motion detector which detects image motion occurrence between video field intervals on a pixel by pixel basis. The motion detector includes a delay means for providing a plurality of video signals from two fields of video signal.

The video signals from the two fields are processed to represent image information corresponding to the same spatial point in the two fields. The processed signals are then compared, and differences between the signals are an indication of interfield image motion.

DESCRIPTION OF THE PREFERRED EMBODIMENTS

As mentioned previously, the simplest approach known to dropout compensation in video replay systems of the type wherein television signals are replayed from a recorded medium, is to replace missing dropout information with information taken directly from a delay having a duration equal to the duration of one or two raster scan lines. However, the quality of replayed television signals derived with this approach is poor when the recorded picture contains diagonal lines or when the dropout duration is greater than the raster scan line delay. These difficulties are substantially overcome by replacing dropout information with information from either a raster scan line delay or a field store delay in accordance with the nature of the dropout information.

Figure 1:
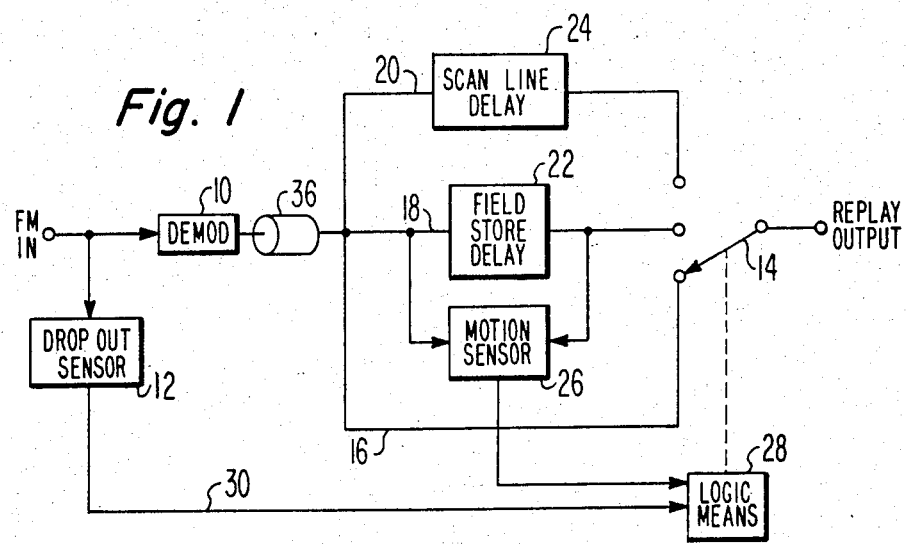
FIG. 1 is a block diagram of video signal defect compensation circuitry.

Either and/or both of the above-mentioned difficulties can be resolved with different arrangements of the circuitry shown in FIG. 1. In FIG. 1, FM signal replayed from the recorded medium is applied to both a demodulator 10 and a sensor means 12 for detecting when dropout occurs. Signals from the demodulator 10 pass through separate paths 16, 18 and 20 to individual inputs of a single-pole triple-throw switch 14 at the output of the replay system. Path 16 passes directly to the switch 14, while path 13 passes through a field store delay 22 and path 20 passes through a raster scan line delay 24. A sensor means 26 is disposed between the input and output of the field store delay 22 for detecting motion in the video signal passing through the field store delay 22. Output from the motion sensor 26 is applied to one input of a logic means 28. Signals from the dropout sensor 12 pass through path 30 to the logic means 28. Logic means 28 responsive to the motion and dropout signals from sensors 26 and 12 respectively controls the switch 14 in accordance with the nature of the dropout. As a matter of practicality, a delay 36 is also disposed between the demodulator 10 and the paths 16, 18 and 20 to allow the logic means 28 time to appropriately control the switch 14 before mutilated video information arrives at that switch.

Whenever a signal dropout is detected by sensor 12 concurrently with no motion being detected by sensor 26 in the field store delay 22, the logic means 28 controls switch 14 to couple path 18 to the replay output. Therefore, replacement information for the missing dropout information is supplied from the field store delay 22 and any diagonal lines in the scene at that time will not deteriorate the quality of the replayed television signal. Whenever dropout is detected by sensor 12 concurrently with motion being detected by sensor 27, however, the logic means 28 controls switch 14 to couple path 20 to the replay output. When no dropout is detected by sensor 12, switch 14 couples path 16 to the output.

Figure 2:
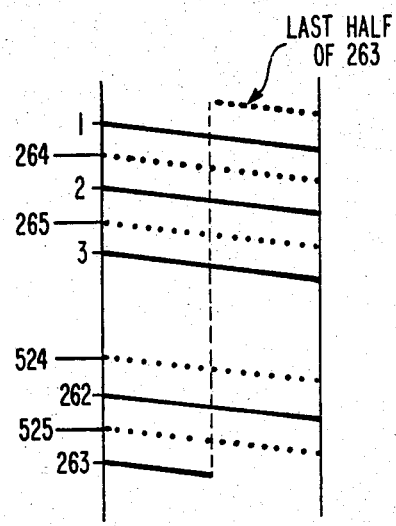
FIGS. 2–4 are pictoral representations of typical TV raster scans.
Figure 3:
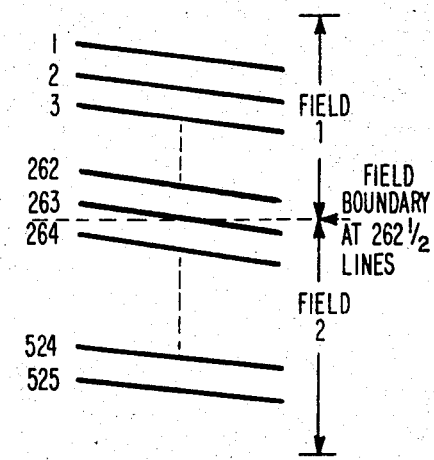

Many approaches may be taken in implementing the dropout compensation means of this invention, with each approach resulting in a particular picture quality and level of hardware complexity. To understand this, it is absolutely necessary that the line sequence structure of NTSC monochrome and color pictures be understood. The monochrome structure is the simpler and therefore, will be described first. Two fields are interlaced in this structure which is usually depicted in textbooks by two interlaced fields as shown in FIG. 2 where the lines of one field are shown solid and the lines of the other field are dotted. However, such a depiction does not clearly represent the nature of the signal as the raster is scanned and therefore, a continuous display of the fields is shown in FIG. 3 for this purpose. Those skilled in the art will realize that the continuous display of FIG. 3 can be "telescoped" to derive the textbook interlaced depiction of FIG. 2. It should be noticed that for the continuous display the first field ends in the middle of line 263 and consequently, the second field begins in the middle of line 263. For monochrome pictures therefore, entry into a field at the beginning of a raster scan line or departure from a field at the end of a raster scan line is only possible at time intervals equal to the duration of two fields.

Figure 4:
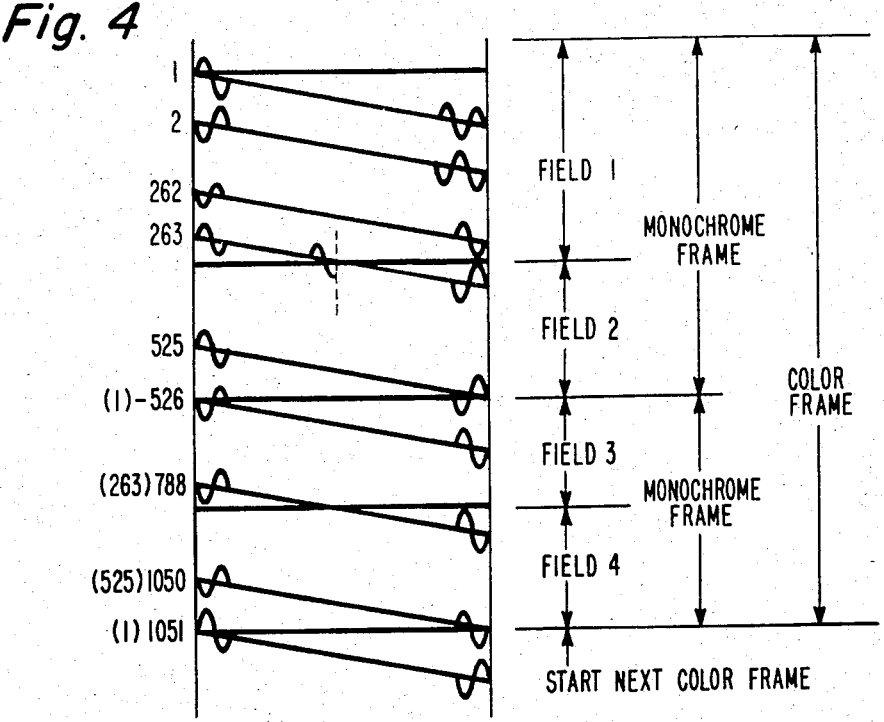

For a color picture, a subcarrier is added to the signal in such a way that there are 227.5 cycles/line. This is done by choosing a subcarrier that is the 455th harmonic of half the line frequency or 3.579545 MHz for an NTSC color picture. If the subcarrier is added to the continuous display as shown in FIG. 4, it is observed that the subcarrier on the first line ends in a half cycle, which means that the second line begins with the other half of that uncompleted cycle. Consequently, every other line has the opposite subcarrier phase so that the subcarrier phase on any given line is 180 degrees from the subcarrier phase of the preceding line. Furthermore, it can be seen that the subcarrier phase on all odd-numbered lines will be the same for a given hue and for the same hue, the subcarrier phase on all even-numbered lines will be shifted by 180 degrees. Continuing the observations in FIG. 4, it is seen that line 262 being even, will be identical in subcarrier phase to lines 2, 4, 6, etc., while line 263 being odd will be identical in subcarrier phase to lines 1, 3, 5, etc. However, the first field ends at mid scan along line 263 after only one-half of 227.5 cycles or 113.75 cycles have occurred on that line. Therefore, that field terminates with a cycle that is only three-fourths completed. From further observations in FIG. 4, it is seen that line 525 being odd, will end on a half cycle. Therefore, line 526 which is actually line 1 of field 3 and the next monochrome frame will have a subcarrier of line 1 in field 1 of the previous monochrome frame. Consequently, field 3 is not the same as field 1 for a color picture. From continued observations in FIG. 4, it is also seen that not until the 1051st line is a color field initiated with a signal having identical characteristics to line 1 at the beginning of field 1 in monochrome frame one. This amounts to a time sequence equal in duration to four fields and therefore, each color frame will include 4 fields. For a static or motionless color picture consequently, any line is identical to the line which occurred 1050 lines earlier. The continuous display of FIG. 4 could be telescoped as was done in FIG. 2 to show that in either a monochrome or color frame, each raster line is adjacent to a line of identical phase for example, lines 3 and 265. Furthermore, in a color frame, the phase of lines at the same relative raster location in fields 1 and 2 have the opposite phase in fields three and four, respectively.

By analyzing the line sequence structure shown in FIGS. 2 and 4 for an NTSC television image, it will be understood that the field store delay 22 in FIG. 1 may have a duration as large as the duration of four fields or as small as the duration of one field minus one-half line for various embodiments of the invention. Since any dropout information is replaced with information from the field store delay 22 in the compensation means of the invention when a static or motionless picture is occurring, the four field delay would provide a perfect replacement for color. This is so because any line being presented in a color frame when dropout occurs is identical to the similarly numbered line from the preceding color frame in the four field delay. Such an arrangement of the field store delay 22 would include a four field delay having its output directed to the input of switch 14 in FIG. 1. No color reprocessing circuitry is necessary in this arrangement. However, motion is likely to exist in a television picture during the time of four fields so that dropout replacement information from such a delay is less desirable than if the duration of the delay were made smaller.

Deriving dropout compensating signals from a two field delay element 22 would include fewer motion induced signal artifacts, however, such an arrangement requires that the chrominance phase be inverted. Dropout information from a one field delay element includes still fewer motion flaws. However, compensation means having a field store delay 22 equal to the duration of one field would not provide good results. This is so because dropout information would then be replaced with information that is misplaced by one-half line, for example, dropout in the right-half of line 265 would be patched with information from the left-half of line three. However, by reducing the duration of the field store delay 22 by one-half line, the dropout information is then replaced with information from the proper side of the picture, for example, dropout in the right-half of line 265 would be patched with information from the right-half of line 2. Since a single field minus one-half line delay is much shorter than the monochrome frame delay or the color frame delay it is much less sensitive to motion. Its sole difficulty is that the replacement information provided thereby is one raster scan line separated from the dropout information in the picture. However, it is superior to a one line delay found in conventional dropout compensators which would patch the dropout of a line with information displaced two lines in the raster and would require chroma inversion as well. It is also superior to the two line delays found in other dropout compensators which even though they avoid chroma inversion, they patch any line of dropout information with information that is displaced by four lines in the raster. A single field plus one-half line delay arrangement could also be utilized in another arrangement. However, a chroma inverter would be essential in that arrangement and it would be slightly more sensitive to motion in the compensation means of the invention due to the additional delay of one raster scan line.

Figure 5:
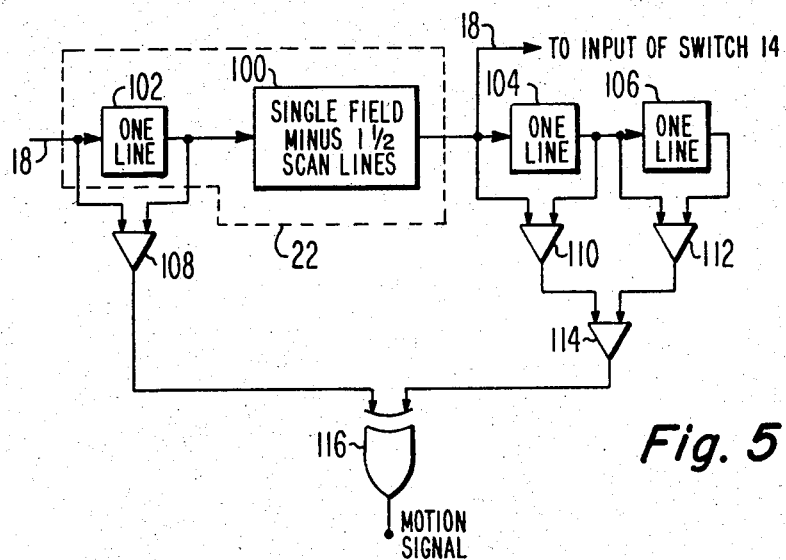
FIGS. 5 and 6 are partial block and partial logic schematic diagrams of motion detection circuitry embodying the present invention.

The motion sensor 26 in FIG. 1 may also be arranged differently in various embodiments of the invention. An exclusive OR circuit in one conventional arrangement could be used as the motion sensor 26, particularly for embodiments in which the field store delay 22 is equal in duration to the duration of four fields. Of course, the input to and output from the field store delay 22 are individually connected to the inputs of the exclusive OR circuit which then produces a high level output whenever spatially related information in a scene or sequential scenes is not identical and motion in the raster is thereby detected. Difficulties can be encountered with this conventional motion sensing arrangement in different embodiments of the invention. For the embodiments having the field store delay 22 equal in duration to the duration of a single field minus one line, there is an unfortunate tendency for this conventional motion sensing arrangement to detect motion erroneously when there are diagonal or horizontal lines in the scene because the information being compared by the exclusive OR circuitry is in adjacent raster scan lines. This difficulty is resolved in the invention, by only comparing luminance information that is intermediate to adjacent raster scan lines. The intermediate luminance information is derived by the well-known technique in which the input to and output from a one raster scan line delay are summed, with the result then being divided by two. FIGS. 2 and 4 should be observed to see that the luminance on line 2 would be closely approximated if information from lines 264 and 265 were averaged using this technique. The same luminance on line 2 would also be closely approximated if information from lines 1 and 2, along with information from lines 2 and 3 are each averaged separately and an average is then derived between those resulting averages. This observation is utilized as illustrated by FIG. 5 wherein the field store delay 22 and the motion sensor 26 are combined in a combined arrangement to resolve the mentioned difficulty. In this combined arrangement, the field store delay 22 in path 18 includes a delay 100 equal to the duration of one field minus one and one-half raster scan lines and another delay 102 equal to the duration of one raster scan line, which are connected in series. The motion sensor 26 includes individual delays 104 and 106, each equal to the duration of one raster scan line. Information passes to the field store delay 22 from the demodulator 10 and from the field store delay 22 through the switch 14 to the replay output. Averaging circuits 108, 110 and 112 are individually connected across each of the delays 102, 104 and 106, respectively, to closely approximate the intermediate luminance information between sequential raster scan lines. The outputs from averaging circuits 110 and 112 are applied to another averaging circuit 114 to closely approximate the luminance of a particular raster scan line from intermediate luminance information. The outputs from averaging circuits 108 and 114 are applied to the individual inputs of an exclusive OR circuit 116 from which the level of output indicates the occurrence of motion.

The operation of this combined arrangement can be understood by assuming that raster scan line 1 is passing from the output of delay 106. Therefore, raster scan line 2 is passing from the output of delay 104, raster scan line 3 is passing from the output of delay 100, raster scan line 264 is passing from the output of the delay 102 and raster scan line 265 is passing into the delay 102. As can be seen from FIGS. 2 and 5, the averaging circuit 112 is closely approximating the luminance information for line 264 and the averaging circuit 110 is closely approximating the luminance information for line 265, while the averaging circuits 114 and 108 are both closely approximating the luminance information for line 2. Consequently, information relating to substantially the same raster scan line is being directed to each input of the exclusive OR circuit 116 which therefore, provides an accurate indication when motion occurs.

It will be appreciated by those skilled in the art of video signal processing that if composite video signal is applied to input 18, and the inputs of the averagers 108, 110 and 112 are coupled to summing circuitry, the respective summing circuits will provide line comb filtered luminnace components. Thus, whether composite video signal or a luminance component signal is applied to input 18 the motion detector will be responsive to the luminance component. Conversely if the motion detector is to be responsive to a chrominance component or the chrominance component of composite video signal, due to the 180 degree phase relationship of chrominance from line-to-line, either one input to each averager 108, 110 and 112 must be inverted or the inputs of each averager must be connected to a subtractor.

Figure 6:
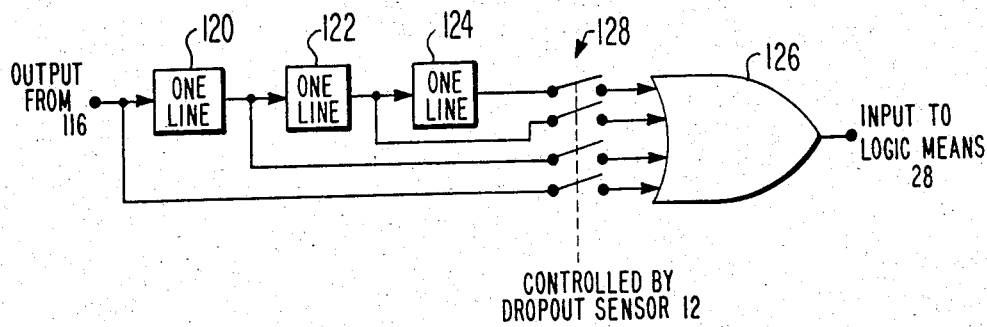

The motion indication by the exclusive OR circuit 116 in FIG. 5 can occur anywhere over 265 lines of the raster. It may be desirable to use compensation signals from the line store whenever motion is detected in the general vicinity of a signal dropout. FIG. 6 illustrates one embodiment of a circuit for detecting motion and dropout in close proximity. Individual delays 120, 122 and 124 equal to the duration of one raster scan line are arranged in series between the output of the exclusive OR circuit 116 in FIG. 5 and one input of an OR gate 126. Individual delays 120, 122 and 124 equal to the duration of one raster scan line are arranged in series between the output of the exclusive OR circuit 116 in FIG. 5 and one input of an OR gate 126. The inputs to each of the delays 120, 122 and 124 are individually connected to other inputs of the OR gate 126 to which each input is directed through an individual normally opened contact of a switch 128. The dropout sensor 12 in FIG. 1 controls the switch 128 to close the contacts when a dropout occurs. Only a single logic level need be stored in the delays 120, 122 and 124 and for the arrangement of FIG. 6, logic levels indicative of proximate motion in the last four raster scan lines before any dropout occurs are directed to the inputs of OR gate 126. Consequently, a logic level for initiating the use of the field store delay 22 to provide the dropout correction is developed at the output of the OR gate 126 only when motion is detected in proximity to a dropout. Of course, this proximity or number of raster scan lines over which motion is detected can be either increased or decreased respectively, by simply adding to or subtracting from the quantity of one raster scan line delays.

The dropout sensor 12 in FIG. 1 could be arranged in accordance with any of the techniques that are well-known for this purpose. One particularly simple technique would be to apply the replayed FM video signal to an AM or peak detector, such as a diode and capacitor combination. When dropout occurs, the AM detector produces a pulse which is directed to a comparator set at a desired level so that the pulse is thereby clipped to derive a signal which indicates the occurrence of dropout. Of course, a drop in the FM frequency could be detected to indicate dropout where the recorded medium is a video disc and a suitable dropout pulse then derived from that indication.

Figure 7:
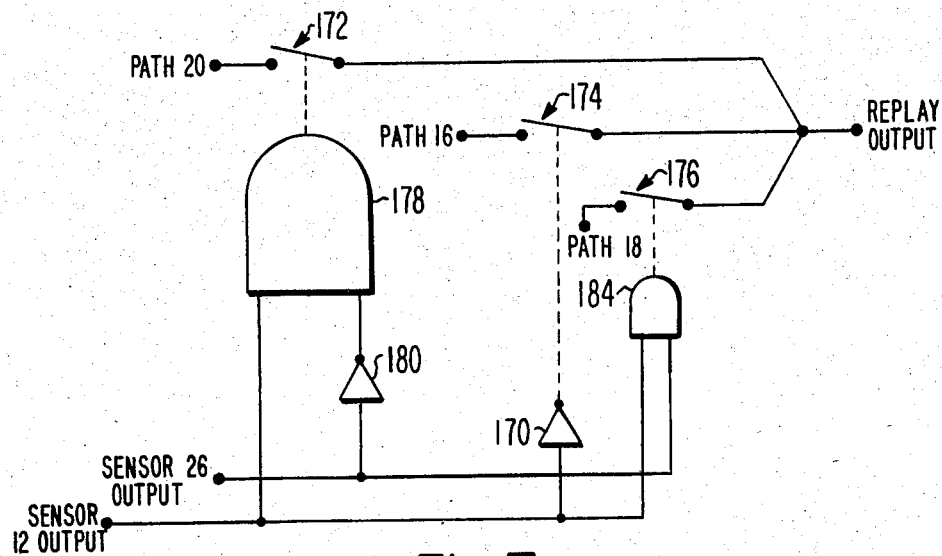
FIG. 7 is a logic schematic diagram of exemplary logic which may be used for logic element 28 of FIG. 1.

Of course, the single pole triple throw switch 14 in FIG. 1 would most likely be implemented in the preferred embodiments of the invention as three individual single pole single throw electronic switches. An arrangement of the logic means 28 in FIG. 1 for one such embodiment is illustrated in FIG. 7. The individual electronic switches are designated 172, 174 and 176 with each switch being normally opened and controlled to close by high logic levels from the logic means 28. The direct video path 16 in FIG. 1 passes through switch 174 which is therefore closed through an inverter 170 whenever a low-level signal is received by logic means 28 from sensor 12 which produces a high level output when dropout occurs. Path 20 which passes through the line delay 24 in FIG. 1 is directed through switch 172 which is therefore closed through an AND gate 178 whenever sensor 12 detects a dropout and motion is detected by sensor 26. A high level signal is produced by sensor 26 when no motion is detected. Consequently, the inputs of AND gate 178 are individually connected to directly receive output from sensor 12 along with output from sensor 26 through an inverter 180. Path 18 which passes through the field store delay 22 in FIG. 1 is directed through switch 176 which is therefore closed through an AND gate 184 whenever sensor 12 detects dropouts and no motion is detected by sensor 26. Thus, the inputs of AND gate 184 are individually connected to directly receive output from sensor 12 and sensor 26 respectively.

What is claimed is:

1. In a video signal processing apparatus; circuitry for detecting image motion comprising:
   a signal input for applying a video signal;
   delay means coupled to said signal input and having a first plurality including one, of signal paths for providing video signals from a first field of the video signal, and having a second plurality, including at least two, of signals paths for providing at least two video signals from a second field of the video signal different from said first field wherein the video signals from said first and second fields are separated by substantially an odd integral number, including one, of field intervals and said at least two video signals are separated from each other by an integral number, including one, of horizontal line intervals;
   first conbining means coupled to said second plurality of signal paths for summing said at least two video signals, to produce a video signal representing approximately like spatial image points as said video signal from said first field;
   means, including means coupled to said first plurality of signal paths and said first combining means for comparing video signals from said first plurality of signal paths with video signals from said first combining means and generating a motion indicating signal having a first state when video signals from said first and second fields differ, and having a second state otherwise.

2. The circuitry set forth in claim 1 wherein said first plurality of signal paths includes three for providing first, second and third video signals from said first field, said second and third video signals being delayed relative to said first video signal by substantially one and two horizontal line intervals respectively; and said means including means further includes:
   means, coupled between said first plurality of signal paths and said means for comparing, for generating an average of said first, second and third video signals.

3. The circuitry set forth in claim 2, wherein the means for generating an average of said first, second and third video signals includes:
   second combining means coupled to said first and second signal paths for generating a first video signal sum;
   third combining means coupled to said second and third signal paths for generating a second video signal sum;
   fourth combining means coupled to said second and third combining means for summing signals provided by said second and third combining means, and having an output coupled to said means for comparing.

4. The circuitry set forth in claim 3 wherein said means including means further includes:
   further delay means, coupled to said means for comparing, and having a plurality of signal paths for providing a plurality of successively delayed signals; and
   an OR gate having respective signal inputs coupled to said plurality of signal paths of said further delay means, and having an output at which a motion detection signal is available.

5. The circuitry set forth in claim 1 wherein said means including means further includes:
   further delay means, coupled to said means for comparing, and having a plurality of signal paths for providing a plurality of successively delayed signals; and
   an OR gate having respective signal inputs coupled to said plurality of signal paths of said further delay means, and having an output at which a motion detection signal is available.

6. A motion detector for detecting image motion in video signals comprising:
   a signal input for applying said video signals;
   delay means, coupled to said signal input, and having first, second, third and fourth signal paths for providing first, second, third and fourth delayed signals respectively delayed relative to said video signal by one horizontal line interval, one field interval less one-half horizontal line interval, one field interval plus one-half horizontal line interval and one field interval plus one and one-half horizontal line intervals;
   first signal averaging means coupled to said signal input and said first signal path for producing a first combined video signal;
   second signal averaging means coupled to said second, third and fourth signal paths for producing a second combined video signal, said first and second combined video signals representing a like image point; and comparing means coupled to said first and second signal averaging means for producing a motion indicating signal.

7. The motion detector set forth in claim 6 wherein said second signal averaging means comprises a first signal summing means coupled to said second and third signal paths for producing a third combined signal;

a second signal summing circuit coupled to said third and fourth signal paths for producing a fourth combined signal; and a third signal summing circuit coupled to said first and second circuits and responsive to said third and fourth combined signals for producing said second combined signal.

* * * * *